(12) United States Patent
Maret et al.

(10) Patent No.: US 9,647,803 B2
(45) Date of Patent: May 9, 2017

(54) COOPERATIVE COMMUNICATION SYSTEM WITH ADAPTIVE PACKET RETRANSMISSION STRATEGY

(71) Applicant: COMMISSARIAT A L'ENERGIE ATOMIQUE ET AUX ENE ALT, Paris (FR)

(72) Inventors: Luc Maret, Polienas (FR); Dimitri Ktenas, Fontaine (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 457 days.

(21) Appl. No.: 14/220,376

(22) Filed: Mar. 20, 2014

(65) Prior Publication Data

US 2014/0289581 A1    Sep. 25, 2014

(30) Foreign Application Priority Data

Mar. 21, 2013  (FR) ..................... 13 52522

(51) Int. Cl.
*H04L 1/18* (2006.01)
*H04L 1/00* (2006.01)
(Continued)

(52) U.S. Cl.
CPC .......... *H04L 1/1829* (2013.01); *H04L 1/0076* (2013.01); *H04L 1/1671* (2013.01);
(Continued)

(58) Field of Classification Search
None
See application file for complete search history.

(56) References Cited

U.S. PATENT DOCUMENTS

| 7,751,468 B2 | 7/2010 | Des Noes et al. |
| 8,027,286 B2 * | 9/2011 | Khan ................. H04L 27/3488 370/315 |

(Continued)

FOREIGN PATENT DOCUMENTS

| WO | WO 2008/024158 A1 | 2/2008 |
| WO | WO 2008/153308 A1 | 12/2008 |
| WO | WO 2012/109725 A2 | 8/2012 |

OTHER PUBLICATIONS

Kun Pang, "Collaborative HARQ schemes for cooperative diversity communications in wireless networks", School of Electrical & Information Engineering, Feb. 2008, 119 Pages.

(Continued)

*Primary Examiner* — Justin R Knapp
(74) *Attorney, Agent, or Firm* — Oblon, McClelland, Maier & Neustadt, L.L.P.

(57) ABSTRACT

The invention proposes a method for the transmission of data in a cooperative network comprising a source terminal (S), a destination terminal (D) and a relay terminal (R), comprising:
in a first transmission (T1), the transmission of the data of a packet by the source terminal (S) to both the relay terminal (R) and the destination terminal (D);
in the event of failure (N1) of the destination terminal (D) to successfully decode the data in the packet of the first transmission, and in the case of the data of the first transmission being successfully (O2) decoded by the relay terminal (R), the relay terminal transmits the data of the packet to the destination terminal in a second transmission (T2);
in the event of failure (N3) of the destination terminal to successfully decode the data in the packet of the second transmission (T2), selection of the source terminal and/or relay terminal to retransmit the data of the (Continued)

packet to the destination terminal in a third transmission (T3), where the selection may be based on an assessment of the reliability of the transmission channel between the source terminal and the destination terminal and of the transmission channel between the relay terminal and the destination terminal.

11 Claims, 5 Drawing Sheets

(51) Int. Cl.
    *H04L 1/16*     (2006.01)
    *H04L 1/20*     (2006.01)

(52) U.S. Cl.
    CPC .............. *H04L 1/20* (2013.01); *H04L 1/0071* (2013.01); *H04L 2001/0097* (2013.01)

(56) References Cited

U.S. PATENT DOCUMENTS

| | | | |
|---|---|---|---|
| 8,155,230 | B2 | 4/2012 | Ktenas et al. |
| 8,245,115 | B2 | 8/2012 | Savin et al. |
| 8,537,801 | B2 | 9/2013 | Calvanese Strinati et al. |
| 8,649,273 | B2 | 2/2014 | Ktenas et al. |
| 8,879,463 | B2 * | 11/2014 | Calvanese Strinati ............ H03M 13/2957 370/315 |
| 2008/0065946 | A1 * | 3/2008 | Choi .................. H04B 7/15592 714/752 |
| 2008/0155148 | A1 | 6/2008 | Oyman |
| 2010/0061321 | A1 | 3/2010 | Calvanese Strinati et al. |
| 2011/0170450 | A1 | 7/2011 | Juntti et al. |
| 2011/0273981 | A1 | 11/2011 | Ktenas et al. |
| 2013/0322287 | A1 | 12/2013 | Bontu et al. |

OTHER PUBLICATIONS

Ezio Biglieri, et al., "Fading channels: Information—theoretic and communications aspects", IEEE Transactions on Information Theory, vol. 44, No. 6, Oct. 1998, pp. 2619-2692.

French Preliminary Search Report issued Nov. 15, 2013 in French Application 13 52522, filed on Mar. 21, 2013 ( with English Translation of Categories of Cited Documents).

Bin Zhao et al. "Practical Relay Networks: A Generalization of Hybrid-ARQ", IEEE Journal on Selected Areas in Communications. vol. 23, No. 1, 2005, 12 pages.

Patrick Herhold et al. "A Simple Cooperative Extension to Wireless Relaying", 2004 International Zurich Seminar on Zurich, Switzerland, 2004, 4 pages.

Extended Search Report issued Sep. 1, 2014 in European Patent Application No. 14160837.2 (with English Machine translation).

U.S. Appl. No. 14/789,007, filed Jul. 1, 2015, Ktenas, et al.

\* cited by examiner

COOPERATIVE COMMUNICATION SYSTEM WITH ADAPTIVE PACKET RETRANSMISSION STRATEGY

TECHNICAL FIELD

The present invention relates in a general manner to cooperative type communication systems. It can in particular be applied in OFDMA (Orthogonal Frequency Division Multiple Access) type systems, for example in WiMAX (IEEE 802.16m), 3GPP-LTE or LTE-Advanced telecommunications systems. It also finds application in the field of sensor networks where the information may be transported by several transmitters.

The invention applies more particularly to a method for the retransmission of erroneous packets adapted to a retransmission context with cooperative relays wherein the encoding of information in a distributed manner between a source terminal and a relay terminal is furthermore possible.

THE STATE OF THE PRIOR ART

Cooperative type wireless communications systems are typically used in the context of cellular communications where communications with users at the edge of cells are difficult (long range, interference with adjacent cells, etc.). They are therefore known to provide greater coverage and decreased susceptibility to fading than conventional cellular systems.

In a first step (not a subject of this invention), a relay is associated with each user who needs to enhance the quality of their connection with the base station, with the aim of offering a quality of service which is homogeneous throughout the cell.

Diagrammatically represented in FIG. 1 is a cooperation strategy in such a system, made up of a source terminal S, a relay terminal R and a destination terminal D. The source terminal S transmits a data flow to a relay terminal R. The relay terminal R receives the data flow and re-transmits it, after, if necessary, decoding and re-encoding it (the relay terminal is then of the 'Decode and Forward' or DF type) to the destination terminal D. This strategy allows the source terminal S, for example a base station of a cellular network, to reach the destination terminal D when the path S-D is not in a direct line due to the presence of an obstacle between the source terminal S and the destination terminal D, or if the distance between the source terminal S and the destination terminal D exceeds the range of the base station.

A cooperative transmission protocol which uses two consecutive transmission phases is, for example, as follows. In a first transmission phase, the source terminal S transmits to the relay terminal R and destination terminal D. In a second transmission phase, the relay terminal R re-transmits to the source terminal S, after encoding and re-encoding if it is of the DF type.

The encoding of the packet transmission from the source terminal and the relay terminal may furthermore be of the distributed type, such as of the Distributed Turbo-Coding (DTC) type. A DTC is a mechanism which distributes, between the source and relay, the encoding of Convolutional Turbo-Code (CTC), generally made up of two convolutional encoders, where a first encoder encodes the bits of a data packet and the second encoder encodes the bits of the same data packet, but which have been interlaced beforehand. A DTC mechanism will therefore consist of the transmission, first of all by the source terminal, of the data of a packet encoded using the first encoder. The relay terminal receives this data, decodes it, then interlaces it and then encodes it using the second encoder. Thus the destination terminal receives the data of the packet encoded by both encoders, and can therefore make use of high-performance iterative-type decoding.

In addition, ARQ (Automatic Repeat reQuest) and HARQ (Hybrid ARQ) retransmission request protocols are known in point-to-point telecommunications systems. In the case of an ARQ, redundant bits are added to the data to be transmitted to enable the receiver to detect any transmission errors, for example by means of a Cyclic Redundancy Check or CRC. If the receiver detects a transmission error, it can request that the transmitter retransmits the data. In the case of an HARQ, the data is furthermore encoded using an error correction code, such as the FEC (Forward Error Correction) code, which also adds redundant bits to the original data and which allows some errors to be corrected without retransmission. If the number of errors is too great to be corrected by the FEC, the receiver sends a negative acknowledgement (NACK for Non-ACKnowledge) to the transmitter in order to request re-transmission.

The international application WO 2008/024158 describes a relay-assisted HARQ protocol. According to this protocol, if the destination terminal does not succeed in decoding the data received from the source terminal during a first transmission interval, the source terminal re-transmits the data during a second transmission interval. In parallel, if the relay terminal succeeds in decoding the data received during the first transmission interval, it retransmits the data to the destination terminal during the second transmission interval. Failing this, the relay terminal remains silent during this second interval. It can therefore be seen that the relay terminal, and therefore the spatial diversity and/or the encoding diversity that it provides, is only taken into consideration if the first transmission has failed.

In addition, from K. Pang, "Collaborative HARQ Schemes for Cooperative Diversity Communications in Wireless Networks", Master's Thesis, The University of Sydney School of Electrical & Information Engineering, 2008, (http://ses.library.usyd.edu.au/handle/2123/2559) a retransmission request protocol for cooperative networks is known wherein the source and the relay retransmit alternately until the original message has been successfully decoded or until a maximum authorised number of retransmissions has been reached.

In this context the objective of the invention is to propose a more elaborate HARQ retransmission mechanism, capable of optimising the resources required for successful retransmission depending of the quality of the connections, in particular in order to reduce consumption of spectral and/or time resources. In particular the objective of the invention is to propose a HARQ mechanism wherein a distributed encoding technique would be incorporated.

PRESENTATION OF THE INVENTION

In order to do this the invention proposes a method for the transmission of a sequence made up of multiple data packets in a cooperative network comprising multiple nodes, including a source terminal, a destination terminal and a relay terminal, comprising:
   in a first transmission, the transmission of the data of a packet by the source terminal to both the relay terminal and to the destination terminal;
   In the event of the destination terminal failing to successfully decode the data of the packet of the first transmission, and in the case of the data of the first transmission being successfully decoded by the relay terminal, the relay terminal transmits the data of the packet to the destination terminal in a second transmission;

In the event of failure of the destination terminal to successfully decode the data of the packet of the second transmission, selection of the source and/or of the relay terminal to retransmit the data of the packet to the destination terminal in a third transmission;

wherein the cooperative network implements a distributed encoding, according to which the source terminal implements encoding of the data of the packet of the first transmission using a first encoder, and according to which in the event of successful decoding of the data of the packet of the first transmission by the relay terminal, the relay terminal interlaces the decoded data to form an interlaced data packet and implements an encoding of said interlaced data packet using a second encoder for the purposes of the second transmission of the data of the packet; and wherein in the event of unsuccessful decoding by the destination terminal of the data of the packet of the second transmission or data of the packet of the third transmission, the destination terminal generates and transmits to the source terminal and to the relay terminal a message for disconfirming of the decoding indicating which of the relay terminal and/or of the source terminal is selected for the retransmission, in a third transmission, of the data of the packet to the destination terminal, said message also indicating whether the data of the packet to be retransmitted in a third transmission are the data of the packet of the first transmission or the data of the packet of the second transmission.

The invention also applies to a cooperative communications network wherein the terminals are configured so as to implement the method according to the first aspect of the invention, as well as to a destination terminal of such a cooperative communications network.

BRIEF DESCRIPTION OF THE DRAWINGS

Other aspects, aims, advantages and characteristics of the invention will become more apparent on reading the following detailed description of its preferred embodiments, given as non-restrictive examples, and undertaken with reference to the appended drawings, wherein, in addition to FIG. 1 already discussed previously.

DETAILED DESCRIPTION OF SPECIFIC EMBODIMENTS

Figure 1:
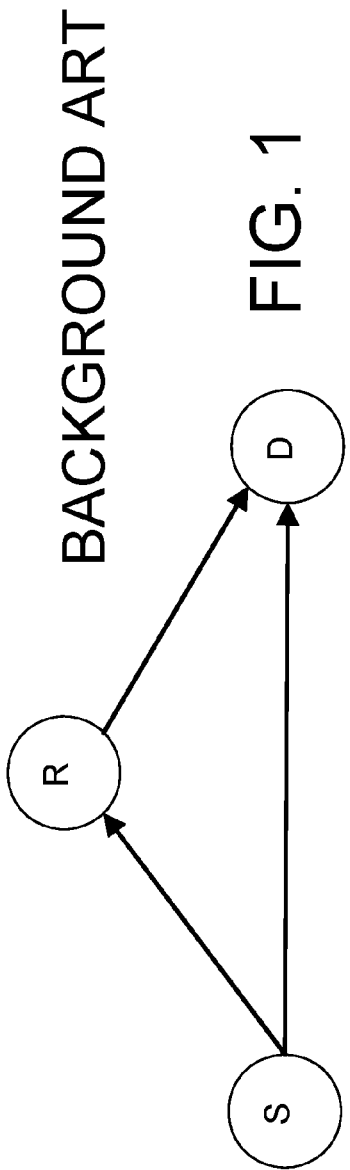

In what follows we will consider a cooperative telecommunications system, also called a cooperative network, comprising a source terminal S, at least one relay terminal R, and a destination terminal D. The expression "source terminal" must be understood in the widest sense, since the invention can in particular apply to the case where a base station transmits data to a user's terminal through its downlink. In the same way, the expression "destination terminal" must be understood in the widest sense, since the invention can apply in particular to the case where the user's terminal sends data to a base station on its uplink. In both of the cases indicated, the data is relayed through the relay terminal, either towards the base station for the uplink, or to the user's terminal for the downlink. Here the expression "relay terminal" is meant in its widest sense, since the latter may cover both a mobile terminal and a base station acting as a relay.

We will assume in what follows that the cooperative telecommunications system preferably, but not necessarily, uses frequency-based transmission resources. The invention will be illustrated in a non-restrictive manner by an OFDMA-type system. In such a system the frequency-based resources are subcarrier intervals of an OFDM multiplex, where each terminal can be allocated such a resource during a transmission interval (dynamic scheduling) or during a succession of such intervals (semi-persistent scheduling).

The transmission channels will be assumed to be of the block fading channel type. In general terms, in a block fading channel a message to be transmitted, for example a codeword, "sees" multiple channel instances. These instances may be time-based and/or frequency-based according to whether the channel is time-selective or frequency-selective. In the particular case of an OFDMA system, the channel instances seen by a codeword are subcarrier intervals (frequency chunks) which substantially experience the same fading.

The invention assumes a transmission channel which is quasi-invariant over time (low mobility). It is therefore necessary, in the case of OFDMA type transmission, for the same blocks of physical resources (frequency/time blocks) to be reused during the transmission, or at least for the blocks of physical resources to belong to the same frequency coherence band.

The basic idea of the invention is to use knowledge of the correct or incorrect decoding of the packet received at the relay terminal, as well as information on the reliability of the links between the source terminal and the destination terminal on the one hand and between the relay terminal and the destination terminal on the other hand to select the terminal (source/relay) which is to perform the retransmission to the destination terminal in the event of incorrect decoding. In the context of distributed coding, of the Distributed Turbo-Codes type for example, one can also define which type of encoder will be used by the selected terminal.

Figure 2:
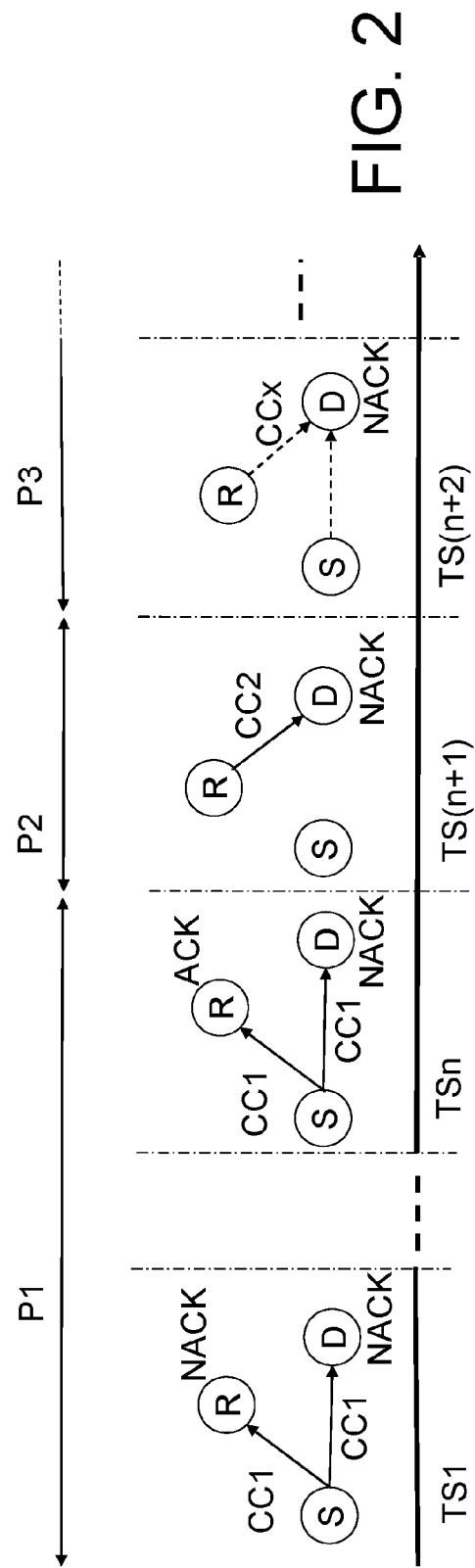
FIG. 2 is a diagram illustrating the duplexing by the time-based division of transmissions and retransmissions carried out in the context of the invention.
Figure 3:
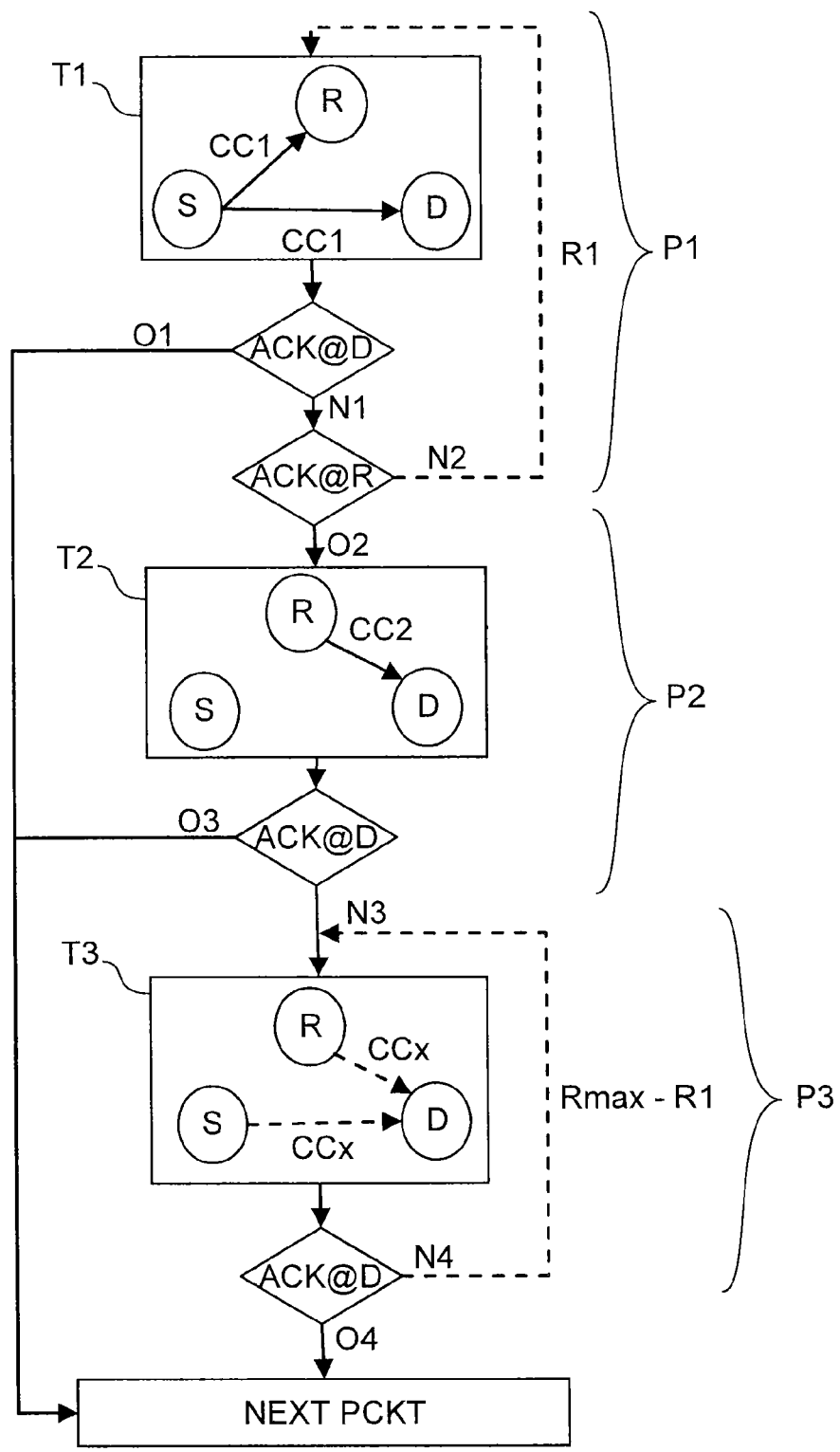
FIG. 3 is a flow chart illustrating the various steps of a method according to one possible embodiment of the invention.

With reference to FIGS. 2 and 3, an embodiment of the method according to the invention is shown for transmission of a sequence made up of multiple data packets in a cooperative network which comprises multiple nodes including a source terminal S, a destination terminal D and a relay terminal R. In this method, duplexing between the transmissions from the source terminal S and those from the relay terminal R is achieved by time-division and includes, in a first transmission T1 over a time interval TS1 of a first phase P1 of the method, the transmission of the data of a packet by the source terminal S to the destination terminal R and the relay terminal R. This data is typically encoded by the source terminal using a first encoder CC1.

Then a check is carried out ("ACK@D" in FIG. 3) on whether correct decoding of the data of the packet of the first transmission T1 has been carried out by the destination terminal.

In the event that this is successful ("O1"), the destination terminal D generates and transmits a decoding confirmation message ACK (positive acknowledgement) to the source terminal S and to the relay terminal R. Then one moves onto the transmission of the next data packet in the sequence ("NEXT PCKT").

In the event that it is unsuccessful ("N1"), the destination terminal D generates and transmits a decoding disconfirming message NACK (negative acknowledgement) to the source terminal S and to the relay terminal R. Then a check is carried out ("ACK@R") on whether correct decoding of the data of the packet of the first transmission T1 has been carried out by the relay terminal. In the event that the decoding of the data of the packet of the first transmission is unsuccessful ("N2") both in the destination terminal D and the relay terminal R, the source terminal reiterates the first transmission T1 over several time intervals (TSn in FIG. 2).

As long as the destination terminal D is not decoding the data of the packet correctly (NACK in FIG. 2), and as soon as the data of the packet are correctly decoded by the relay terminal R (ACK in FIG. 2, at the end of the n-th first transmission T1; "O2" in FIG. 3), the method includes, in a second transmission T2 over a time interval TS(n+1) of a second phase P2, the transmission of the data of the packet by the relay terminal R to the destination terminal D. This data typically corresponds to the data received from the source terminal, after decoding, interlacing of the decoded data to form an interlaced data packet and encoding of the interlaced data packet using a second encoder CC2 with the second transmission in mind.

It will be noted that the reiteration of the first transmission T1 may be limited to R1 iterations. If, at the end of these R1 iterations, neither the destination terminal D nor the relay terminal R has correctly decoded the data in the packet, the transmission of the packet is abandoned and one moves on to the transmission of the next packet in the sequence.

Then a check is carried out ("ACK@D" in FIG. 3) on whether correct decoding of the data from the packet of the second transmission T2 has been carried out by the destination terminal D.

In the event that this is successful ("O3"), the destination terminal D generates and transmits a decoding confirmation message ACK (positive acknowledgement) to the source terminal S and to the relay terminal R. Then one moves onto the transmission of the next data packet in the sequence ("NEXT PCKT").

In the event that this is unsuccessful ("N3"), the destination terminal D generates and transmits a decoding disconfirming message NACK (negative acknowledgement) to the source terminal S and to the relay terminal R. The source terminal S and/or the destination terminal D are then selected for the retransmission in a third transmission T3 of the data in the packet over a time interval TS(n+2) of a third phase P3, whose destination is the destination terminal D. The data in the packet that are transmitted in a third transmission T3 may be either the data in the packet of the first transmission (that is, the data encoded by the first encoder CC1) or the data in the packet of the second transmission (that is the data interlaced and encoded by the second encoder CC2).

As long as the destination terminal does not correctly decode the data from the packet of the third transmission T3 ("ACK@D" and "N4" in FIG. 3), the third transmission T3 is reiterated by one and/or the other of the source terminal S and of the destination terminal D. In the event of unsuccessful decoding, the destination terminal D generates and transmits a decoding disconfirming message NACK to the source terminal S and to the relay terminal R.

In the event that the decoding by the destination terminal ("O4") of the data in the packet of the third transmission is successful, the destination terminal generates and transmits to the source terminal S and to the relay terminal R a decoding confirmation message ACK, and one moves onto the transmission of the next data packet in the sequence.

It will be noted that the reiteration of the third transmission may be limited to (Rmax-R1) iterations. If, at the end of these iterations, the destination terminal D has not correctly decoded the data in the packet, the transmission of the packet is abandoned and one moves on to the transmission of the next packet in the sequence.

In the context of the invention, the selection of the relay terminal and/or of the source terminal for a third transmission T3 may be based on an assessment of the reliability for said third transmission of the transmission channel between the source terminal and the destination terminal and of the transmission channel between the relay terminal and the destination terminal.

An accurate diagnosis can be made of whether a transmission channel which could take part in the third transmission is sufficiently reliable in the sense that it will be possible to correct, at the destination terminal D, the data in a packet which has been transmitted over this channel.

It should be recalled here that the transmission channels are assumed to be of the block-fading channel type. Since a specific selected lot of instances of the propagation channel possesses a finite number of states, the channel is non-ergodic, and allows a null Shannon capacity. The Shannon capacity, expressed as the mean of mutual information over all instances of the channel is not a relevant variable for characterising a non-ergodic channel such as a radio channel. One must therefore turn to the concepts of outage and outage probability introduced by E. Biglieri et al. in the article entitled "Fading channels information-theoretic and communication aspects" published in IEEE Trans. on Information Theory, vol. 44, no. 6, October 1998, pages 2619-2692.

In general terms the radio channel is characterised at any given instance by the instantaneous mutual information in this channel, where the instantaneous character refers to the channel instance that is being considered.

The probability of a channel outage is defined as the probability that the instantaneous mutual information for this channel, for a given fading occurrence, is less than the information throughput that requires to be transmitted on this channel. If the instantaneous mutual information of the channel is denoted as I, then the channel will be in an outage situation if R>I where R is the transmission bitrate. Once the channel is in an outage situation it will not be possible to correct a data packet that has been transmitted on this channel. Furthermore any re-transmission of this packet during the channel coherence time (that is, during the time period over which its attenuation may be regarded as having varied very little) will also be destined to failure.

The outage probability $P_{out}$ may therefore be expressed as:

$$P_{out} = Pr(I(\gamma,\alpha) < R),$$

where $I(\gamma,\alpha)$ is a random variable which represents the instantaneous mutual information for a given instance of the channel $\alpha$, and $\gamma$ is the instantaneous signal to noise ratio.

For a generic channel encoding C, assuming decoding of maximum likelihood type, it is possible to express the probability of a packet error for the code C as follows:

$$P_e^C(\gamma) = P_{e|out}^C(\gamma) P_{out}^C(\gamma) + P_{e|\overline{out}}^C(\gamma)(1 - P_{out}^C(\gamma))$$

where $P_{e|out}^C(\gamma)$ and $P_{e|\overline{out}}^C(\gamma)$ are, respectively, the packet error probabilities when the transmission is in outage and when it is not. For codes which reach capacity, the previous equation allows a near upper bound defined as follows:

$$P_e^C(\gamma) \underset{\approx}{<} P_{out}^C(\gamma) + \underbrace{P_{e|\overline{out}}^C(\gamma)(1 - P_{out}^C(\gamma))}_{P_{noise}^C(\gamma)}$$

Two components of the packet error probability can therefore be distinguished: outage due to the channel instances, and that due to additive noise. Consequently when retransmission is required, if a connection is in outage, it makes no sense to retransmit over the same connection. On the other hand, if the transmission is not in outage, the packet error is then due to unfavourable creation of additive noise, and thus the same channel may be reused for the retransmission.

The detection of the outage of a channel is based upon the calculation of the instantaneous mutual information associated with the transmission that has failed on the channel in question (for example from the relay to the destination or from the source to the destination):

$$I(\gamma, \alpha) = \frac{1}{n_c} \sum_{i=1}^{n_c} I_i(|\alpha_i|^2, \sigma^2)$$

Where $$I_i(|\alpha_i|^2, \sigma^2) = \log_2(M) - \frac{1}{M} \sum_{k=1}^{M} E_z \left[ \log_2 \left( \sum_{q=1}^{M} A_{i,k,q} \right) \right]$$

and $$A_{i,k,q} = \exp\left( -\frac{|\alpha_i a_k + z - \alpha_i a_q|^2 - |z|^2}{2\sigma^2} \right)$$

The previous equation is derived from K. Pang's thesis discussed above, where a is the vector of the directly transmitted signal, complex or real. All the required information may be directly available at the receiver:
- M (order of modulation) and R (encoding efficiency) are known since the modulation and coding scheme is known to the receiver;
- The channel fadings $\alpha_i$ and the variance in the additive noise $\sigma^2$ may be known at the receiver by using in a manner which is known per se, a channel estimation which uses detection of pilot symbols introduced into the data frame;
- a is known to the demodulator to the receiver,
- z is the additive Gaussian noise samples vector of zero mean and of variance $\sigma^2$.

The instantaneous mutual information is calculated over $n_c$ subcarriers over which the packet is transmitted. The complexity introduced at the receiver is low, since in practice the instantaneous mutual information can be easily calculated using pre-stored tables or using polynomial expansion. More precisely, the corresponding instantaneous mutual information is calculated for each discrete value of the variance of the noise by simulation. These values may then be stored in a table or LUT (Look Up Table). Alternatively from these values it may be deduced coefficients of a polynomial approximation of $I_i$ as a function de $\sigma^2$ and the coefficients thus calculated stored in a table.

Returning to the description of the method according to the invention, once the instantaneous mutual information is estimated at the destination terminal for each link connected to it (Source-Destination and Relay-Destination), several embodiments are possible for selecting which of the source terminal and/or relay terminal will retransmit, according to whether or not the ability to predict a total outage of the transmission after the maximum number (Rmax-R1) of allowed re-transmissions is provided.

In each of these embodiments, in order to select the terminal (source and/or relay) which will re-transmit, the outage probability is calculated in order to evaluate the quality of the Source-Destination and Relay-Destination links and in order to assess whether or not the re-transmission will fail. The destination terminal decides which terminal will re-transmit (source and/or relay) and the type of data (retransmission in the same form as, or in a different form to, the packet data where the form is a function of the constituent encoder used) to be retransmitted. The acknowledgement messages ACK/NACK transmitted by the destination terminal to the source terminal and to the relay terminal, in particular those following on from a second transmission T2 and those following on from a third transmission T3, contain this information (either choice of the retransmission terminal and choice of the constituent encoder to be used, or a decision to stop retransmissions, as will be detailed below).

In a first embodiment, in order to estimate whether there will be an outage, only the mutual information with the preceding transmissions and those to come are calculated, still assuming that the propagation channel has not varied. This mutual information relates to the time interval TS(n+i) of the third phase P3 in FIG. 2, and it is estimated by having selected both the source terminal S and the relay terminal R to carry out the future retransmission of type T3, as detailed in the following equation:

$$I_{n+i} = I((n+i-1) \cdot \gamma_{SD}, \alpha_{SD}) + I(i \cdot \gamma_{RD}, \alpha_{RD})$$

where the indices SD and RD respectively designate the retransmission channels of the source terminal and of the relay terminal respectively, to the destination terminal.

In order to decide which terminals will retransmit and with which data, it is first of all verified whether, in the case of retransmission only by the relay terminal R, the transmission channel between the relay terminal and the destination terminal is in outage. If this is the case, then the data that would be retransmitted by the relay terminal cannot be decoded without error by the destination terminal. If this is not the case, then in the absence of an outage, the channel capacity is deemed to be sufficient, the relay terminal R is then selected and retransmission of the data of the packet by the relay terminal R proceeds through a third transmission T3.

If there is an outage by retransmission by the relay terminal alone, a verification is undertaken to establish whether in the case of retransmission by the source terminal alone, the transmission channel between the relay terminal and the destination terminal is in outage. In the absence of an outage, the channel capacity is deemed to be sufficient, the source terminal S is selected and retransmission of the data of the packet proceeds by the source terminal S, in a third transmission T3. If on the other hand there is an outage, the source terminal S and the relay terminal R are both selected to carry out the retransmission of type T3.

In a second embodiment, an assessment is made of whether there is a "total outage", that is, whether the system will still be in outage even after the maximum number of retransmissions, whilst selecting both the source terminal S and the relay terminal R to carry out all possible retransmissions of type T3. This "total outage" is estimated in accordance with the mutual information calculation detailed in the following equation:

$$I_{tot}=I(R\max\cdot\gamma_{SD},\alpha_{SD})+I((R\max-R1+1)\cdot\gamma_{RD},\alpha_{RD})$$

If there is a "total outage", the decision is taken to abandon the packet and to move onto the transmission of the next packet. If there is no total outage, one then examines in which configuration the retransmissions result in a system without outages, forcing the use of the same node(s) for all retransmissions. In other terms, if there is no total outage, one examines whether there is an outage by using only the relay terminal for all retransmissions. If this case leads to an outage, one then carries out the examination of having all retransmissions through the source terminal. If this case also gives rise to an outage, the decision is taken to retransmit with the relay terminal and with the source terminal. The various steps in this second embodiment are as follows.

It is first of all verified whether, in the case of retransmission only by the relay terminal R, the transmission channel between the relay terminal and the destination terminal is in outage. In the absence of an outage, the channel capacity is deemed to be sufficient, the relay terminal R is then selected and retransmission of the packet data by the relay terminal R proceeds, in a third transmission T3.

If there is an outage by retransmission by the relay terminal alone, a verification is undertaken to establish whether in the case of retransmission by the source terminal alone, the transmission channel between the relay terminal and the destination terminal is in outage. In the absence of an outage, the channel capacity is deemed to be sufficient, the source terminal S is then selected and retransmission of the packet data by the source terminal S proceeds, in a third transmission T3.

In the event of an outage by retransmission by the source terminal alone, a verification is carried out of whether there is a total outage in the case of retransmission both by the source terminal S and by the relay terminal R. In the absence of a total outage, the source terminal S and the relay terminal R are selected and retransmission of the packet data by the source terminal S and by the relay terminal R proceeds, in a third transmission T3. If there is a total outage, the packet is abandoned and one moves on to the transmission of the next packet.

In each of these embodiments, the destination terminal indicates the type of data to be transmitted.

In a first variant, the packet data are retransmitted identically. In other words, if the relay terminal is selected, the data corresponds to the packet data received in the first transmission T1, decoded, interlaced and encoded using the second encoder CC2. If the source terminal is selected, the data correspond to the packet data encoded using the first encoder CC1.

In a second variant, retransmission of the other version of the packet data is carried out (data encoded by the first encoder in accordance with the first transmission T1 or data interlaced and encoded by the second encoder in accordance with the second transmission). By way of an example, if the relay terminal is selected for a retransmission T3, in that case the relay terminal will not carry out the interlacing of the data received in the first transmission T1 and decoded, and will encode it with the first encoder CC1 for transmission to the destination terminal. If the source terminal is selected, it carries out interlacing of the data and encodes it using the second encoder CC2 for transmission to the destination terminal. This variant allows advantage to be taken of the diversity of the channels on each encoded packet.

In a third variant, preferentially used when it is sought to optimise the diversity and the reliability of data on each input to the two decoders of the destination terminal, alternate retransmission is carried out of each version of the packet data, irrespective of which of the relay terminal and/or source terminal has been selected.

These preceding variants are preferable in the case where the dominant criterion is the cost or energy consumption at the destination end.

In a fourth variant, the number of retransmissions of a version of the packet data can also be limited, with the maximum number being a function of the reliability of the data received previously by each of the two convolutional decoders. In other words, typically the retransmission of the least reliable encoder is requested at the receiver. The benefits of this mechanism increase as the maximum number of transmissions increase.

In the preceding descriptions the example of distributed turbo-codes has been taken. Thus the destination terminal also applies both to a terminal capable of receiving, demodulating and decoding the data from a single terminal (Viterbi type single-channel decoding) and to a terminal capable of receiving, demodulating and decoding the data from two terminals using distributed encoding (iterative type decoding). At each new retransmission received at the destination terminal, the received data of said retransmission are recombined with data received from preceding transmissions. This recombination is achieved by summation of the various versions received from the inputs to each decoder making up the turbo-decoder in the destination terminal (Combining method).

The invention is not however limited to this embodiment example, but also applies, for example, to the transmission of complete turbo-codes from the source terminal and/or the relay terminal. In the case of the use of complete turbo-codes during the first transmission phase, the source terminal may then send the data encoded by the first encoder CC1 and the data encoded by the second encoder CC2. In the event of failure ("N1") of the destination terminal D to decode the data in the packet of the first transmission, and in the case of the data of the first transmission being successfully decoded ("O2") by the relay terminal R, the relay terminal R may also retransmit the data encoded by the first encoder CC1 and the data encoded by the second encoder CC2 to the destination terminal D in a second transmission T2. In the event of failure ("N3") of the destination terminal D to decode the data in the packet of the second transmission T2, the destination terminal selects the source terminal and/or the relay terminal to retransmit and the type of encoder to be used (first encoder CC1 alone, second encoder CC2 alone or complete turbo-codes), for a retransmission of type T3, where the selection can be based on an evaluation of the reliability for said retransmission T3 of the transmission channel between the source terminal and the destination terminal and of the transmission channel between the relay terminal and the destination terminal.

It is to be understood that by estimating the quality of the links, the invention allows only those links required for the proper retransmission of the packet to be chosen, and if appropriate the manner in which they must retransmit their packet. The invention also allows an outage to be predicted and if appropriate allows the transmission of the packet to be stopped in order to free up resources.

These various functionalities allow a cooperative network which implements the method according to the invention to exhibit enhanced levels of performance in comparison with protocols which request persistent retransmission from all nodes, or protocols based on less well optimised criteria for selecting the retransmission nodes and the type of data.

These improved levels of performance may be observed in terms of average channel encoding efficiency (directly proportional to the average number of retransmissions carried out) and in terms of normalised average rate. This rate is the product of the mean encoding efficiency by the probability of receiving a correct package. This rate is a direct expression of the flow of correctly decoded information that the system can achieve:

- at very low signal to noise ratio (SNR), the invention does not systematically result in improved normalise rate since the error rate remains very high. It provides significant improvements however in average encoding efficiency: the outage prediction anticipates pointless retransmissions and time-based and/or spectral resources are conserved.
- at medium SNR the invention provides improved normalised rate, primarily due to the fact that the fluctuations in propagation channels for each links are correctly estimated and that the retransmissions are therefore redirected over the best links, which allows the same level of correct decoding to be achieved, but with fewer resources, giving rise to higher levels of rate.

Figure 4:
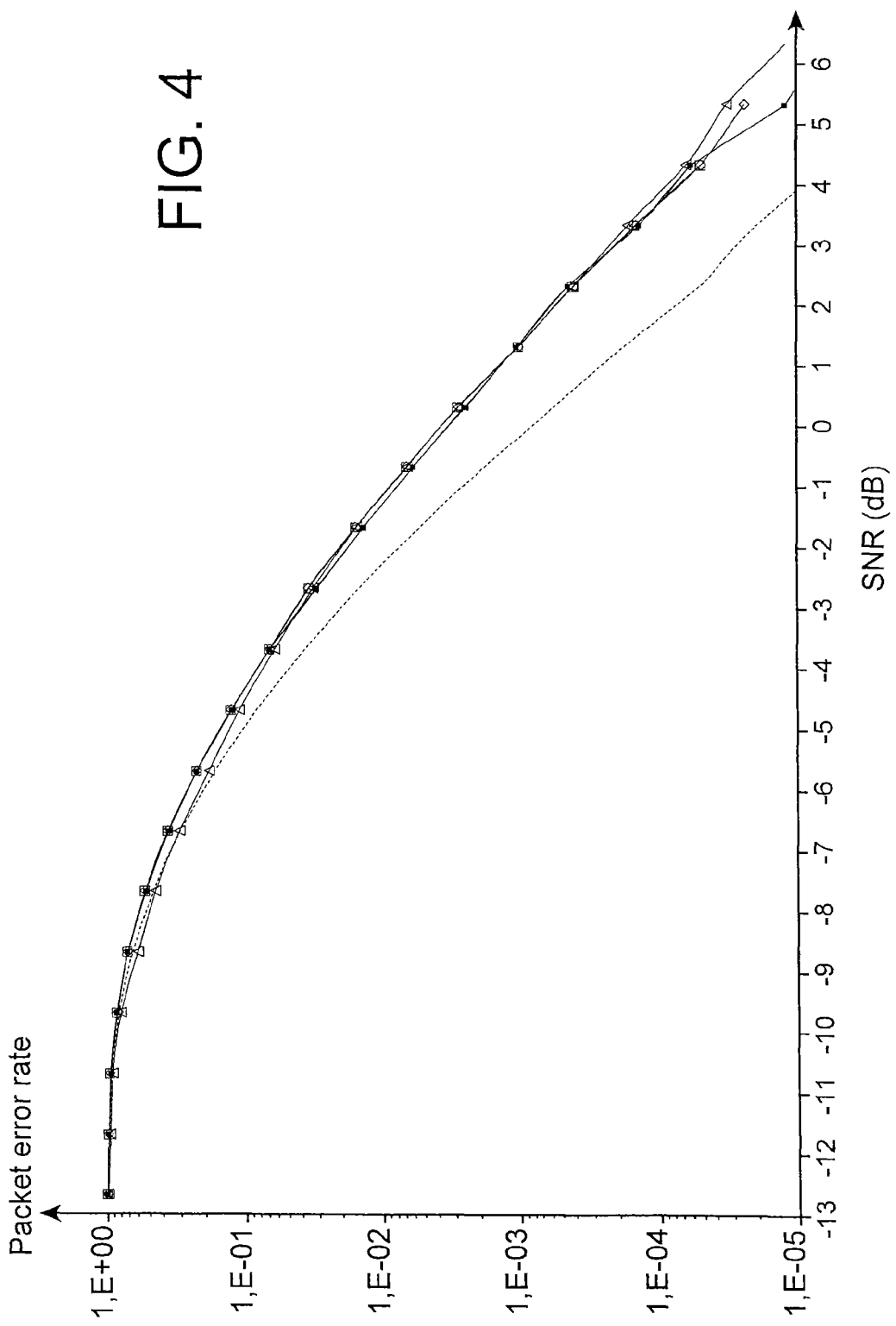
FIGS. 4-6 are the results of simulations which illustrate the levels of performance achieved by the method according to the invention.
Figure 5:
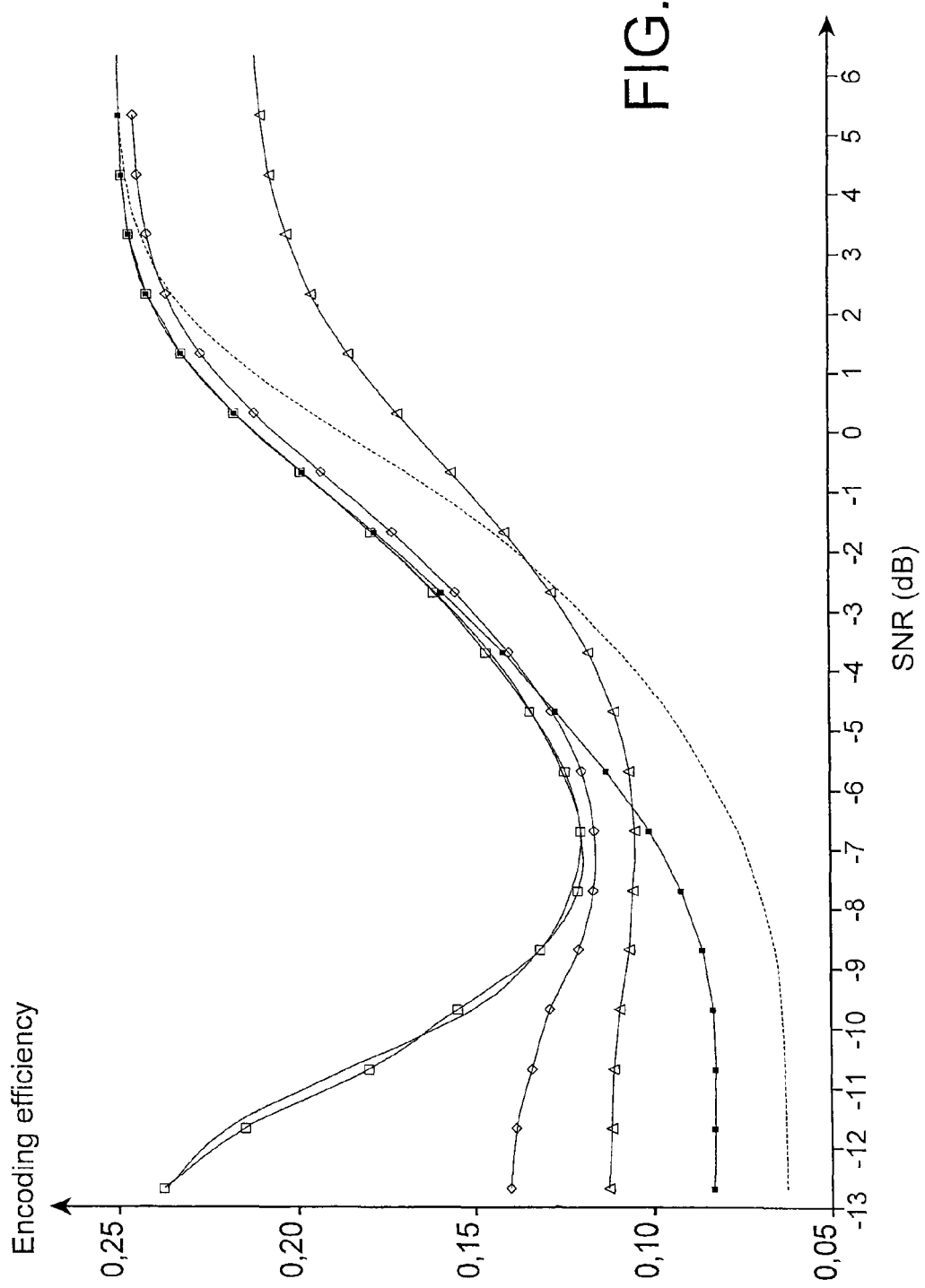
Figure 6:
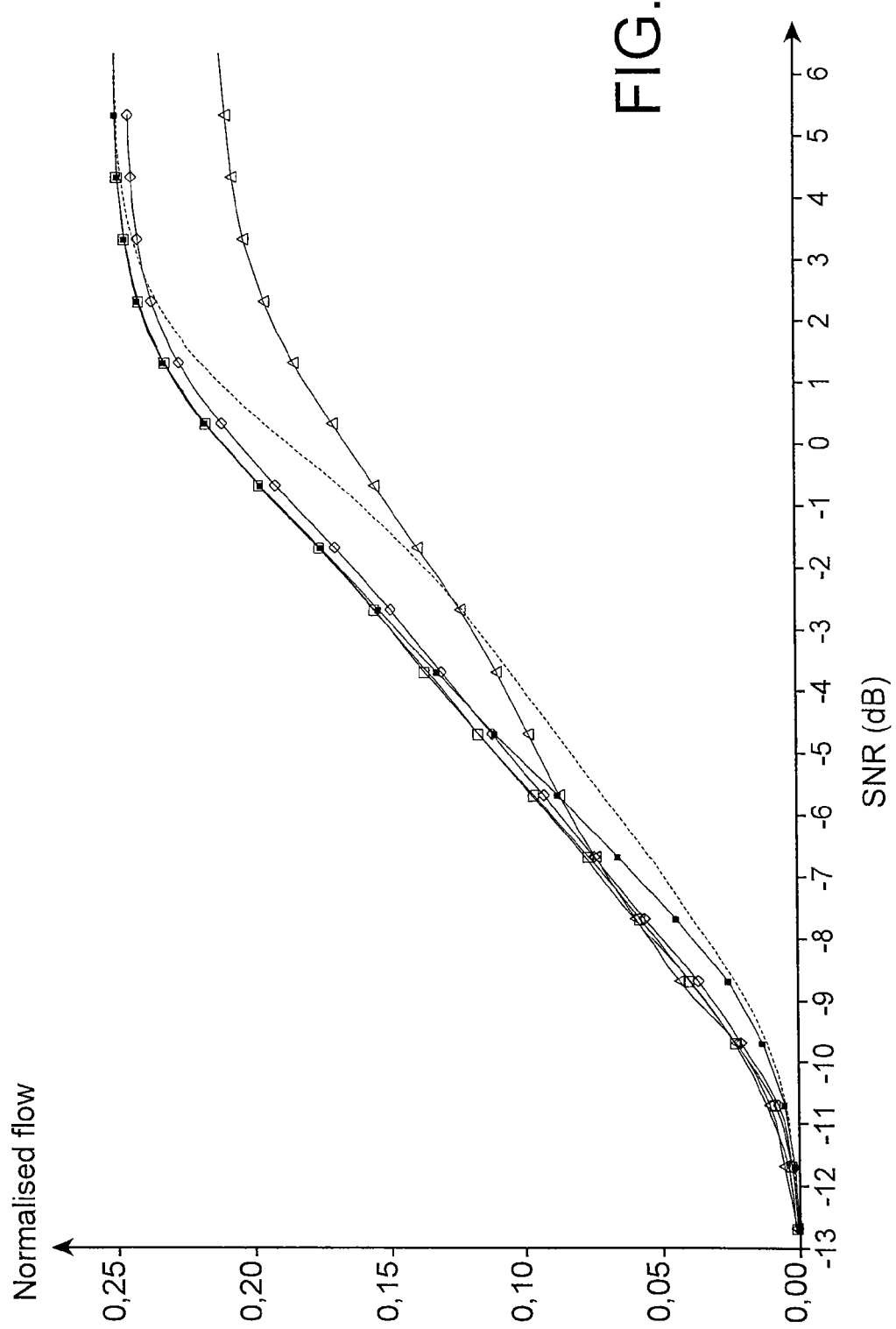

FIGS. 4-6 illustrate the advantages of the invention. These figures have been obtained from the results of simulations wherein the encoding, the HARQ and retransmission decision making processes are simulated exactly as they would occur in reality. On the other hand, as far as the modulation and propagation channel aspects are concerned, these are also modelled and therefore do not exactly reflect an in-situ manifestation which would show the degradation due to implementation losses of the modulation and radio-frequency parts and losses due to propagation channels, These losses, however, would be expressed as an offset in terms of the signal to noise ratio which would affect all the systems examined here (state of the art and the invention) in the same manner. Thus the performance comparisons presented hereafter remain valid.

In these simulations, the channel is assumed to remain constant throughout the entire duration of the retransmission process. The Source to Relay connection is simulated in a realistic manner, with a constant SNR which is independent of the SNR of the other two connections. The three system connections are modelled by 4-state fading channels, by statistically independent blocks, selective in terms of frequency and governed by a Rayleigh equation. 16-state convolutional systematic recursive encoders with efficiency ½ and generating polynomial $(23,35)_O$ are used at the source and at the relay. The information block size is 400 bits. The turbo-decoder used at the destination is of the Max-Log-MAP type with a maximum iteration number of 12. An asymmetric SNR scenario is considered wherein the mean SNR over the relay-destination connection is 10 dB better than that of the source-destination connection.

The performance levels are assessed in terms of:
- residual Packet Error Rate (PER) (after the number of retransmissions used);
- mean encoding efficiency (in other terms the efficiency of the initial encoder (½) weighted by the mean retransmission number at the SNR under consideration);
- normalised rate: product of the mean encoding efficiency by 1 less the residual PER.

FIGS. 4-6 illustrate the levels of performance of the various systems:
- Dotted line curve: considered to be the "state of the art", this system, without analysis of the quality of the various connections, requests continuous retransmission from the 2 nodes, source and relay.
- Unbroken line curve-black square markers: this system implements the first embodiment of the invention, that is, without forecasting of total outage after the maximum number of retransmissions.
- Smooth unbroken line curve and unbroken curve with light markers: this system implements the second embodiment of the invention, that is, with forecasting of total outage.

For the first two systems, the source to relay connection is assumed to be perfect. For the third, the smooth unbroken curve shows the performance levels in the case of a perfect source-relay connection, and the unbroken curves with light-markers show the levels of performance when an actual source-relay connection is simulated, with different fixed SNRs (20 dB, 10 dB and 5 dB for curves with square light markers, lozenge-shaped light markers and triangular-shaped light markers respectively).

FIG. 4 represents the residual Packet Error Rate (PER) as a function of the Signal to Noise Ratio (SNR) for connections leading to the destination terminal (R-D connection). It can be seen that the invention does not offer any advantage in comparison with the base solution which requests continuous retransmission from the source and from the relay. This is not the objective that is sought by this invention.

FIG. 5 represents the mean encoding efficiency as a function of the SNR over the connections leading to the destination terminal. In the region of low signal-to-noise ratios, it can be seen that the invention offers an average efficiency which is much higher than that of the state of the art, thus showing a visible quantification of the pointless transmissions that are avoided by the advanced method used. This expresses the advantage in terms of the resources saved. In the region of average signal to noise ratios, the invention still exhibits a non-negligible gain of 1 to 2 dB in comparison with the base solution which requires continual retransmission from the source and from the relay. The positive effects of intelligent decision making of the choice of the retransmission node(s) and the type of data can be seen here.

The smooth unbroken curve gives the performance levels of the invention in the case of an ideal source-relay connection. This curve can therefore be compared to that of the dotted line, also simulating an ideal source-relay connection. By observing the curves with light markers, we can also see that invention, in a real source-relay context always functions better than the state of the art system in an ideal source-relay context, when the signal to noise ratio for this connection is greater than 10 dB.

FIG. 6 represents the normalised flow as a function of the SNR. In the region of average SNRs, the invention can be seen to exhibit a non-negligible gain of 1 to 2 dB in comparison with the base solution (broken line curve) which requires continual retransmission from the source and from the relay.

In the same manner as in FIG. 5, the smooth unbroken curve gives the performance levels of the invention in the case of an ideal source-relay connection. This curve can therefore be compared to that of the dotted line, also simulating an ideal source-relay connection. By observing the curves with clear markers, we can also see that invention, in an actual source-relay context still functions better than the state of the art system in an ideal source-relay context, when the signal to noise ratio for this connection is greater than 10 dB.

The invention is not limited to the previously described method. It also applies to a cooperative communications network which uses this method, wherein said network comprises multiple nodes including a source terminal suitable for transmitting a sequence made up of multiple data packets, a destination terminal and a relay terminal, wherein:

the source terminal is configured in order, in a first transmission, to transmit data of a packet at the same time to the relay terminal and to the destination terminal;

the relay terminal is configured so that in the event of failure of the destination terminal to successfully decode the data in the packet of the first transmission, and in the case of the data of the first transmission being successfully decoded by the relay terminal, the relay terminal transmits the packet's data to the destination terminal in a second transmission;

the destination terminal is configured, in the event of failure of the destination terminal to successfully decode the data in the packet of the second transmission, to select the source terminal and/or relay terminal to retransmit the packet data to the destination terminal in a third transmission, said selection being based on an assessment of the reliability of the transmission channel between the source terminal and the destination terminal and of the transmission channel between the relay terminal and the destination terminal, wherein a distributed encoding is implemented according to which the source terminal is configured to implement an encoding of the data in the packet of the first transmission using a first encoder, and according to which in the event of successful decoding of the data of the packet of the first transmission by the relay terminal, the relay terminal is configured to interlace the decoded data to form an interlaced data packet and to implement an encoding of said interlaced data packet using a second encoder for the purposes of the second transmission of the packet data; and wherein in the event of unsuccessful decoding by the destination terminal of the data in the packet in the second transmission or of the data in the packet of the third transmission, the destination terminal is configured to generate and transmit to the source terminal and to the relay terminal a message for disconfirming of the decoding indicating which of the relay terminal and/or of the source terminal is selected for the retransmission, in a third transmission, of the data of the packet to the destination terminal, said disconfirming message of the decoding indicating also whether the data in the packet to be retransmitted in a third transmission are data from the packet of the first transmission or data from the packet of the second transmission.

And the invention also applies to a destination terminal in such a cooperative communication network, characterised in that it is configured, in the event of unsuccessful decoding of the data in the packet of the second transmission, to select the source terminal and/or relay terminal to retransmit the packet data to the destination terminal, in a third transmission, and to generate and transmit to the source terminal and to the relay terminal, a decoding disconfirming message which indicates which of the relay terminal and/or of source terminal is selected for the retransmission of the data of the packet to the destination terminal, in a third transmission, said decoding disconfirming message also indicating whether the packet data to be retransmitted in a third transmission are the data of the packet of the first transmission or the data of the packet of the second transmission.

The invention claimed is:

1. A method for the transmission of a sequence made up of multiple data packets in a cooperative network comprising multiple nodes, including a source terminal, a destination terminal and a relay terminal, said method comprising:

in a first transmission, transmitting data of a packet by the source terminal to both the relay terminal and the destination terminal;

when the destination terminal fails to successfully decode the data of the packet of the first transmission, and when the data of the packet of the first transmission is successfully decoded by the relay terminal, the relay terminal transmits the data of the packet to the destination terminal in a second transmission;

when the destination terminal fails to successfully decode the data of the packet of the second transmission, selecting the source terminal and/or the relay terminal to retransmit the data of the packet to the destination terminal in a third transmission, wherein said selecting comprises an assessment of a reliability for said third transmission of a first transmission channel between the source terminal and the destination terminal and of a second transmission channel between the relay terminal and the destination terminal, said assessment of a reliability of the first and second transmission channels includes an assessment of a probability of outage of each of said first and second transmission channels when the relay terminal and/or source terminal are selected for a retransmission of the data of the packet to the destination terminal in the third transmission, wherein an outage of the first or second transmission channel is detected when an instantaneous mutual information for said first or second transmission channel is less than a bitrate to be transmitted on said first or second transmission channel;

wherein the cooperative network implements a distributed encoding, according to which the source terminal implements encoding of the data of the packet of the first transmission using a first encoder, and according to which when the data of the packet of the first transmission is successfully decoded by the relay terminal, the relay terminal interlaces the decoded data to form an interlaced data packet, implements an encoding of said interlaced data packet using a second encoder and transmits the encoded interlaced data in the second transmission; and wherein when the destination terminal fails to successfully decode the data of the packet of the second transmission or the data of the packet of the third transmission, the destination terminal generates and transmits to the source terminal and to the relay terminal a message for disconfirming of the decoding indicating which of the relay terminal and/or of the source terminal is selected for retransmitting, in the third transmission, the data of the packet to the destination terminal, said disconfirming message also indicating whether the data of the packet to be retransmitted in the third transmission are data from the packet of the first transmission or data from the packet of the second transmission;

wherein when the destination terminal fails to successfully decode the data of the packet of the third transmission, the selection of the source terminal and/or of the relay terminal are reiterated, and when said selection and third transmission have been reiterated a first finite number of times, the transmission of the data of said packet is abandoned and one moves onto a next packet of data in said sequence; and wherein said assessment of a reliability of the first and second transmission channels includes an assessment of a probability of outage for the first finite number of third transmissions when the relay terminal and the source terminal are selected for the retransmission, in the third retransmission, of the data of the packet to the destination terminal, where an outage is detected when an instantaneous mutual information comprising the first finite number of retransmissions to come on the first and second transmission channels is less than a bitrate to be transmitted on said first and second transmission channels.

2. The method according to claim 1, wherein when the relay terminal fails to successfully decode the data of the packet of the first transmission, the source terminal reiterates the first transmission, and when said first transmission has been reiterated a second finite number of times, the transmission of the data of said packet is abandoned and one moves onto a next packet of data in said sequence.

3. The method according to claim 1, wherein when said assessment of a reliability of the first and second transmission channels does not detect an outage of the first transmission channel when retransmitting only by the relay terminal, the relay terminal is selected to retransmit the data of the packet to the destination terminal in the third transmission.

4. The method according to claim 1, wherein when said assessment of a reliability of first and second transmission channels detects an outage of the first transmission channel when retransmitting only by the relay terminal, and does not detect an outage of the second transmission channel when retransmitting only by the source terminal, the source terminal is selected to retransmit the data of the packet to the destination terminal in the third transmission.

5. The method according to claim 1, wherein when said assessment of a reliability of the first and second transmission channels detects an outage of the first transmission channel when retransmitting only by the relay terminal, and an outage in the second transmission channel when retransmitting only by the source terminal, the source terminal and the relay terminal are selected to retransmit the data of the packet to the destination terminal in the third transmission.

6. The method according to claim 1, wherein when said assessment of a reliability of the first and second transmission channels detects an outage of said first and second transmission channels when retransmitting by the source terminal and by the relay terminal, the transmission of the data of said packet is abandoned and one moves on to a next data packet in said sequence.

7. The method according to claim 1, wherein the detection of an outage and the selection of the source terminal and/or of the relay terminal in order to retransmit the data of the packet to the destination terminal in the third transmission are carried out by the destination terminal.

8. The method according to claim 1, wherein when the relay terminal, or source terminal respectively, is selected in order to retransmit the data of the packet to the destination terminal in the third transmission, the relay terminal and source terminal respectively retransmits the data of the packet of the second transmission and first transmission, respectively.

9. The method according to claim 1, wherein when the relay terminal, and source terminal respectively, is selected in order to retransmit the data of the packet to the destination terminal in the third transmission, the relay terminal and source terminal respectively implements an encoding using the first encoder of said data of the packet of the first transmission, and an interlacing of said data and encoding of said interlaced data using said second encoder respectively.

10. A cooperative communication network comprising multiple nodes including a source terminal suitable for transmitting a sequence comprising multiple data packets, a destination terminal and a relay terminal, wherein:

the source terminal is configured in order to, in a first transmission, transmit data of a packet to both the relay terminal and the destination terminal;

the relay terminal is configured, when the destination terminal fails to successfully decode the data in the packet of the first transmission, and when the relay terminal successfully decodes the data of the first transmission, to transmit the data of the packet to the destination terminal in a second transmission;

the destination terminal is configured, when the destination terminal fails to successfully decode the data of the packet of the second transmission, to select the source terminal and/or the relay terminal to retransmit the data of the packet to the destination terminal in a third transmission, wherein said selecting comprises an assessment of a reliability for said third transmission of a first transmission channel between the source terminal and the destination terminal and of a second transmission channel between the relay terminal and the destination terminal, said assessment of a reliability of the first and second transmission channels includes an assessment of a probability of outage of each of said first and second transmission channels when the relay terminal and/or source terminal are selected for a retransmission of the data of the packet to the destination terminal in the third transmission, wherein an outage of the first or second transmission channel is detected when an instantaneous mutual information for said first or second transmission channel is less than a bitrate to be transmitted on said first or second transmission channel;

wherein a distributed coding is implemented according to which the source terminal is configured to implement an encoding of the data in the packet of the first transmission using a first encoder, and according to which when the relay terminal successfully decodes the data of the packet of the first transmission, the relay terminal is configured to interlace the decoded data to form an interlaced data packet, to implement an encoding of said interlaced data packet using a second encoder, and to transmit the encoded interlaced data in the second transmission;

wherein when the destination terminal fails to successfully decode the data of the packet of the second transmission or the data of the packet of the third transmission, the destination terminal is configured to generate and transmit to the source terminal and to the relay terminal a message for disconfirming of the decoding indicating which of the relay terminal and/or of the source terminal is selected for the retransmission, in the third transmission, of the data of the destination terminal, said disconfirming message indicating also whether the data in the packet to be retransmitted in the third transmission are data from the packet of the first transmission or data from the packet of the second transmission;

wherein when the destination terminal fails to successfully decode the data of the packet of the third transmission, the selection of the source terminal and/or of the relay terminal are reiterated, and when said selection and third transmission have been reiterated a first finite number of times, the transmission of the data of said packet is abandoned and one moves onto a next packet of data in said sequence; and wherein said assessment of a reliability of the first and second transmission channels includes an assessment of a probability of outage for the first finite number of third transmissions when the relay terminal and the source terminal are selected for the retransmission, in the third retransmission, of the data of the packet to the destination terminal, where an outage is detected when an instantaneous mutual information comprising the first finite number of retransmissions to come on the first and second transmission channels is less than a bitrate to be transmitted on said first and second transmission channels.

11. A destination terminal in a cooperative communication network, suitable for receiving data from a source terminal through a first communication channel and for receiving data from a relay terminal through a second communication channel, where the source terminal is configured to transmit data of a packet in a first transmission to both the relay terminal and the destination terminal, where the relay terminal is configured, when the destination terminal fails to successfully decode the data in the packet of the first transmission, and when the relay terminal successfully decodes the data in the first transmission, to transmit the data in the packet to the destination terminal in a second transmission, where the cooperative network implements a distributed encoding, according to which the source terminal implements encoding of the data of the packet of the first transmission using a first encoder, and according to which when the relay terminal successfully decodes the data of the first packet of the first transmission, the relay terminal interlaces the decoded data to form an interlaced data packet implements an encoding of the said interlaced data packet using a second encoder and transmits the encoded interlaced data in the second transmission, wherein, when the destination terminal fails to decode the data of the packet of the second transmission, said destination terminal is configured:

to select the source terminal and/or the relay terminal to retransmit the data of the packet to the destination terminal, in a third transmission, wherein said selecting comprises an assessment of a reliability for said third transmission of a first transmission channel between the source terminal and the destination terminal and of a second transmission channel between the relay terminal and the destination terminal, said assessment of a reliability of the first and second transmission channels includes an assessment of a probability of outage of each of said first and second transmission channels when the relay terminal and/or source terminal are selected for a retransmission of the data of the packet to the destination terminal in the third transmission, wherein an outage of the first or second transmission channel is detected when an instantaneous mutual information for said first or second transmission channel is less than a bitrate to be transmitted on said first or second transmission channel; and to generate and transmit to the source terminal and to the relay terminal, a decoding disconfirming message which indicates which of the relay terminal and/or the source terminal is selected for the retransmission of the data of the packet to the destination terminal in the third transmission, said decoding message also indicating whether the data of the packet to be retransmitted in the third transmission are the data of the packet of the first transmission or the data of the packet of the second transmission;

wherein when the destination terminal fails to successfully decode the data of the packet of the third transmission, the selection of the source terminal and/or of the relay terminal are reiterated, and when said selection and third transmission have been reiterated a first finite number of times, the transmission of the data of said packet is abandoned and one moves onto a next packet of data in said sequence; and wherein said assessment of a reliability of the first and second transmission channels includes an assessment of a probability of outage for the first finite number of third transmissions when the relay terminal and the source terminal are selected for the retransmission, in the third retransmission, of the data of the packet to the destination terminal, where an outage is detected when an instantaneous mutual information comprising the first finite number of retransmissions to come on the first and second transmission channels is less than a bitrate to be transmitted on said first and second transmission channels.

* * * * *